March 6, 1962     K. M. GORDON ETAL     3,023,604
BEARING VIBRATION AND NOISE TESTER
Filed Oct. 2, 1959                                              2 Sheets-Sheet 1

INVENTORS
KEITH M. GORDON
DAVID E. CLARK
BY THEODORE P. BARNARD

ATTORNEYS

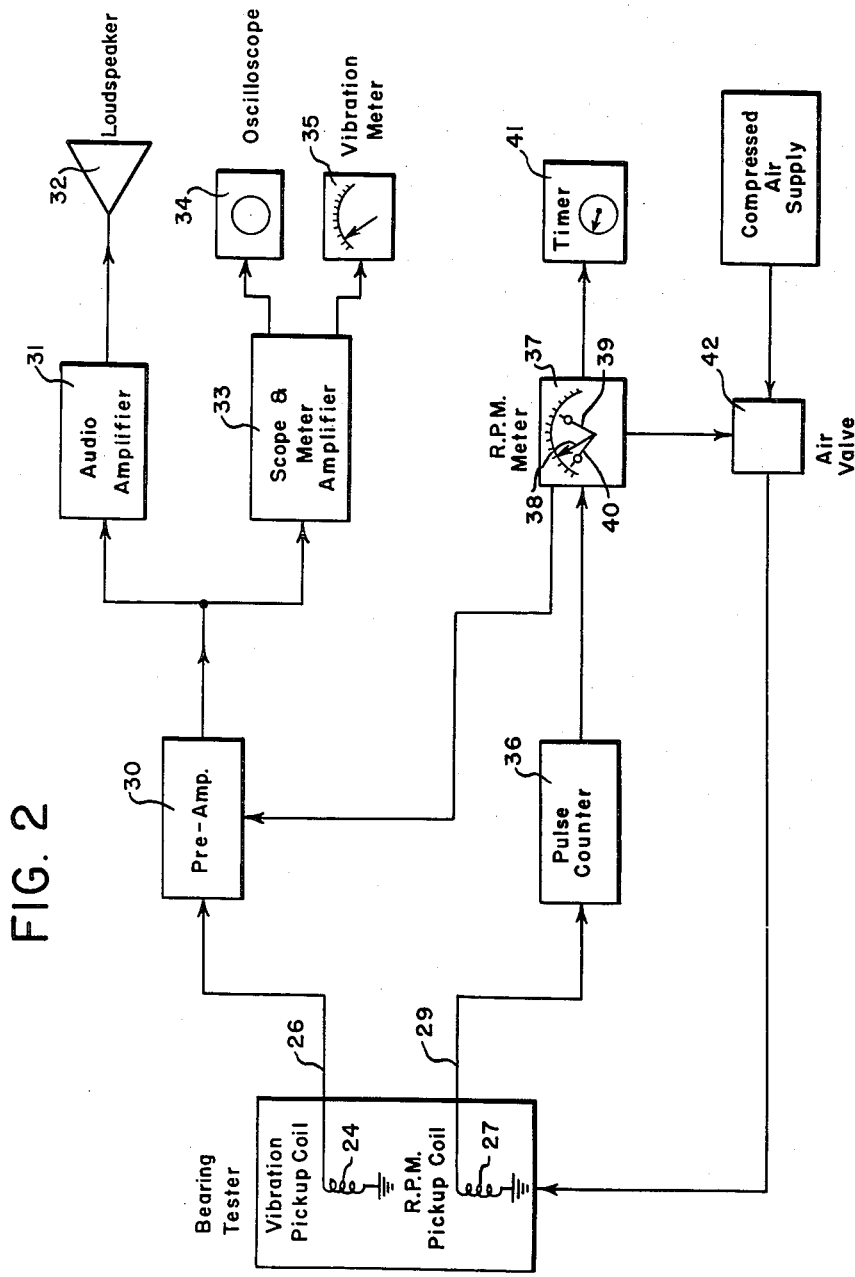

United States Patent Office 3,023,604
Patented Mar. 6, 1962

3,023,604
BEARING VIBRATION AND NOISE TESTER
Keith M. Gordon, Westmoreland, and David E. Clark and Theodore P. Barnard, Keene, N.H., assignors to Miniature Precision Bearings, Inc., Keene, N.H., a corporation of New Hampshire
Filed Oct. 2, 1959, Ser. No. 843,957
8 Claims. (Cl. 73—9)

The present invention relates to test instruments for measuring the overall dynamic operating quality of a ball-bearing assembly, and more particularly to an instrument which is adapted to test such a ball-bearing assembly by rotating the outer race and measuring the axial vibrations produced on the inner race.

In many phases of industry there exists a great unfilled demand for a simple, inexpensive test instrument which is capable of providing a speedy qualitative evaluation of precision ball-bearing performance. The need for such a test instrument is particularly keen in applications where the ultimate in smooth performance and extreme reliability are paramount requirements. The instrument provided by this invention has extremely high sensitivity to damaged or contaminated bearings and is adapted to fulfill the aforementioned needs by measuring the minute vibrations set up along the axial direction on an axially loaded driven bearing which are produced by rough surfaces on the ball elements, rough raceways, foreign particles, brinell marks and the like.

In general the instrument of this invention is adapted to measure the aforementioned bearing defects and others by driving the outer race of a test bearing which has been loaded in the axial direction and measuring the axial vibrations produced on the inner race. In a preferred embodiment of the invention a velocity sensitive electromechanical transducer is employed to sense the axial vibrations. The inner race of the bearing is mounted on a vertical spindle which is suspended in space by a pair of flexible diaphragms mounted in a suitable cylindrical housing. A non-magnetic rotor drum is mounted on the outer race and rotated by a plurality of air jets to a desired measuring speed. Thus only the outer race of the bearing is rotated and the axial vibrations produced on the fixed position inner race by bearing defects are sensed by a velocity-sensitive transducer comprising a multiple turn coil mounted on the opposite end of the vertical spindle and adapted to move through a magnetic flux field. A signal voltage is produced in the vibration pickup coil the amplitude of which is proportional to the velocity of the bearing vibration.

A plurality of small permanent magnets mounted equally spaced around the periphery of the rotor drum function cooperatively with a separate fixed position pickup coil to generate electrical pulses at a frequency which is proportional to rotor speed. These pulses are counted by an electrical counter circuit which is employed to automatically turn off the compressed air supply when the rotor has reached a given desired rotational speed. At the same time an automatic timer is turned on to measure the spin down time required for the bearing to coast or spin down from the aforementioned maximum speed to some predetermined minimum speed. A qualitative measure of bearing running torque is thereby expeditiously effected.

The electrical signals produced by the velocity sensitive electromechanical transducer are amplified and measured by a peak-reading voltmeter which may be calibrated to read maximum motion or velocity. Thus a qualitative measure of the magnitude of the vibration producing defects of the bearing is effected by the test instrument.

Further means for evaluating the nature of the bearing vibrations is provided by way of a loudspeaker which reproduces the amplified electrical vibration signals occurring in the audible frequency range. In addition an oscillosope is provided as a visual aid for evaluating the displayed electrical vibration signals.

For a more complete understanding of the invention reference should be had to the accompanying drawings in which:

FIG. 2 is a block diagram of the electrical circuits employed in a preferred embodiment of the bearing vibration and noise tester.

Figure 1:
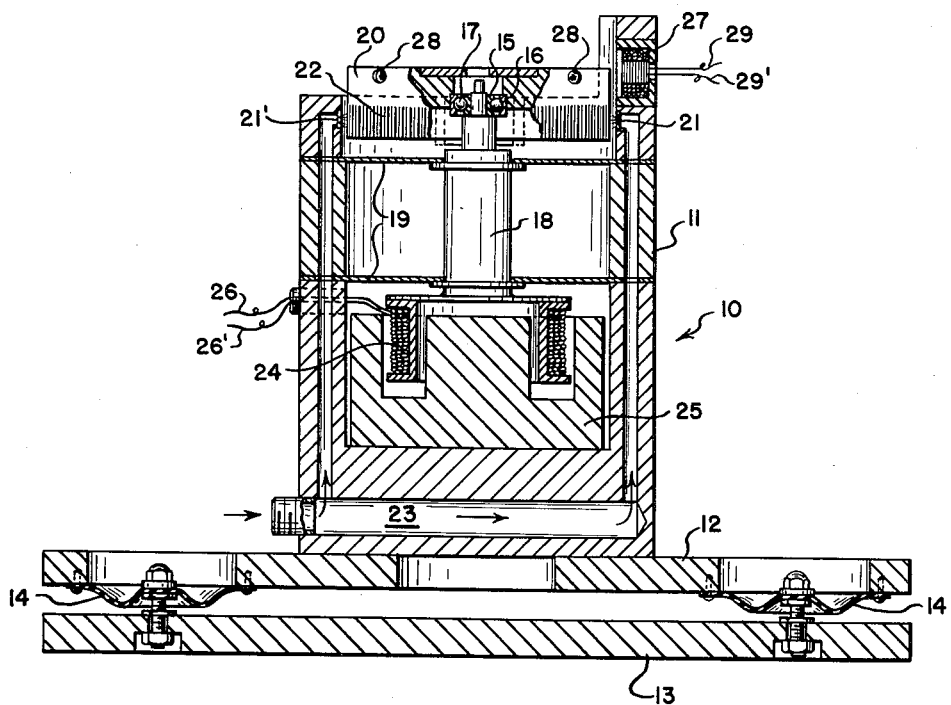
FIG. 1 is a sectional view of the bearing vibration and noise tester showing the general arrangement of parts.

Referring to the drawings there is shown in FIG. 1 a bearing tester 10 comprising a cylindrical housing 11 mounted on plate 12, which is in turn supported by base plate 13 with vibration shock-mounts 14. A ball-bearing assembly comprising inner race 15, outer race 16 and ball elements 17 is shown mounted on fixed vertical spindle 18 which is in turn supported by the housing by flexible diaphragms 19. A rotor drum 20 made of non-magnetic material such as aluminum is mounted on the outer race of the bearing to be tested. This rotor element provides the necessary desired axial loading on the bearing under test and at the same time provides the mechanical coupling required to drive the outer race of the bearing. Rotational drive for the rotor is effected by a pair of air jets 21, 21' which are directed at an angle (approx. 15°) towards the grooves 22 embossed on the outer periphery of the rotor. Compressed air is supplied to the driving jets via duct 23 from a valve-controlled compressed air supply the operation of which will be described more fully hereinafter. One of the chief advantages of the air driven rotor provided by this invention lies in the fact that rotation is effected without introducing undesired external vibration from the rotor drive system, into the measuring instrument.

A velocity sensitive electromechanical transducer comprising a multiple-turn cylindrical coil 24 mounted on spindle 18 and a permanent magnet 25 mounted in the base of the housing is provided to measure the axial vibrations produced on the fixed inner race when the outer race is rotated by the air driven rotor load. Vibrations produced on the inner race due to bearing defects cause the entire spindle and coil to vibrate on the flexible diaphragms and thereby cause a voltage to be produced across the pickup coil 24 when said coil is moved through the magnetic lines of flux produced by permanent magnet 25. The voltage produced by this coil, which is proportional in amplitude to the velocity of the bearing vibration, is connected to measuring circuits with conductors 26, 26'. The operation of these circuits will be explained more fully hereinafter in conjunction with FIG. 2.

The rotational speed of the rotor is measured by pulse generating apparatus comprising a multiple-turn pickup coil 27 and eight permanent magnets 28 (two shown) equally spaced around the periphery of the rotor. A voltage pulse is produced across the coil output leads 29, 29' each time one of the permanent magnets rotates past the pickup coil. The rate of incidence or frequency of these generated pulses is measured to determine the rotational speed of the rotor and hence the speed of the outer bearing race.

Referring to FIG. 2 there is shown therein a simplified electrical block diagram of the circuits provided in accordance with the teachings of this invention. The electrical vibration signals produced across pickup coil 24 are connected via conductor 26 to pre-amplifier 30.

The output signal of pre-amplifier 30 is connected to audio amplifier 31 which drives loudspeaker 32 and also to a "scope" and meter amplifier 33 which supplies oscilloscope 34 with an amplified vibration signal for visual display purposes. A second signal output is supplied by the "scope" and meter amplifier to vibration meter 35 which is adapted to measure the maximum peak-to-peak vibration signal produced by the test bearing during a test-cycle interval. The frequency response of the above mentioned amplifiers is substantially flat from 200 cycles to 10 kilocycles. Operating tests have established that most of the axial bearing vibrations fall in a frequency range between 500 and 1000 cycles per second, with the exact range being determined primarily by the axial yield rate of the bearing and the mass of the spindle and vibration coil. While the frequency range of these vibrations is substantially independent of rotational speed of the bearing, as a practical matter the speed is advantageously selected to fall in a range between 600 and 1800 r.p.m. At higher speeds any dynamic unbalance present in the rotor will introduce spurious vibration components in the bearing measurements.

The rotational speed of the rotor drum is measured by an electronic tachometer comprising pickup coil 27, pulse counter 36 and an r.p.m. meter 37. Eight permanent magnets located around the periphery of the rotor drum are provided to generate voltage pulses in the pickup coil 27 when the rotor is rotated by the air jets. The frequency of the periodic pulses induced in the coil is proportional to the rotational speed of the rotor. Pulse counter 36 produces an output voltage which is proportional to the frequency of the incoming pulses and this voltage is measured by r.p.m. meter 37 which may be calibrated with the aid of a tachometer to read directly in revolutions per minute.

In addition to the normal moving hand 38, meter 37 also has a high limit hand 39 and a low limit hand 40. These hands carry electrical switch contacts which function cooperatively with switch contacts on the moving hand to provide the desired speed control switching circuits. Both limit hands are adjustable by individual knobs located on the front face of the meter.

In a typical test cycle the upper limit hand would be set at 800 r.p.m. for example, and the lower limit hand at say 400 r.p.m. After the solenoid controlled air valve 42 is opened by pushing a start button, the jet driven rotor increases in rotational speed until the indicator needle contacts the upper limit hand at which time the above mentioned switch contacts function to turn on the automatic timer 41, turn off the solenoid operated air valve 42 and energize the pre-amp 30. When the pre-amp is energized by switching the B+ supply on (or closing a normally open switch in the signal circuit), the loudspeaker and oscilloscope are supplied with the amplified vibration signals and the vibration meter measures the maximum amplitude of the vibration signals. After the air supply has been turned off, the rotor loses speed and the r.p.m. indicator hand drops back and touches the lower limit hand switch-contact thereby turning off the timer.

Thus the instrument of this invention provides an accurate, simple, convenient and rapid means for testing the general quality of precision ball-bearings by detecting the axial vibrations of a loaded bearing driven at a controlled rotational speed. The amplified vibrations are displayed on an oscilloscope for visual evaluation, reproduced on a loudspeaker for aural evaluation, and measured by a peak reading meter for qualitative evaluation. At the same time the instrument automatically measures the time required for the bearing to spin down from a selected maximum speed to a selected minimum speed provding thereby a qualitative measure of bearing friction or running torque. Clearly bearings having low friction between the races require the longest time interval for spin down while those bearings having high friction (rough races, rough ball elements, dirt, etc.) require a much shorter time interval for spin down.

The vibration meter shown at 35 in FIG. 2 may be calibrated in arbitrary units where the instrument is employed to make comparative bearing vibration measurements. In certain instances on the other hand it will be advantageous to calibrate the meter in units of velocity, e.g., microns-per-second. One method which has been found to be satisfactory for effecting such a calibration has involved driving the vertical spindle and pickup coil with an external electromagnetic system which is energized by an alternating current of a known frequency and measured amplitude. The mass of the entire system including the spindle, measuring coil and driving coil is measured and the force F produced by the A.-C. driving current may then be computed by proportion after the amount of coil current required to suspend the coil (a known mass) in the vicinity of the magnet has been measured. The velocity V is computed from the well known equations $V=AT$ where $T=$time and $A=$acceleration (Force/Mass).

While a preferred embodiment of the invention has been shown and described herein, various modifications within the scope of the appended claims will be apparent to those skilled in the art.

We claim:

1. Apparatus for testing a ball-bearing assembly comprising in combination, a housing, means for supporting said bearing assembly comprising a spindle which is adapted to mate with the inner race member thereof, means for vertically supporting said spindle in said housing, said means including a pair of flexible diaphragms, means for axially loading said bearing assembly comprising a rotor drum which is adapted to mate with the outer race member thereof, means for rotating said rotor drum comprising a plurality of spaced jets which are adapted to be energized by compressed gas, an electro-mechanical transducer associated with said spindle for producing an output signal voltage which is proportional in amplitude to the velocity of axial vibrations produced thereon, said transducer including a low mass pickup-coil mounted on said spindle with means mounted on said housing for producing a fixed magnetic field surrounding said coil, and indicator means for measuring said signal voltage.

2. Apparatus for testing a ball-bearing assembly in accordance with claim 1 in which said indicator means comprises an oscilloscope, a loudspeaker and a voltmeter.

3. Apparatus for testing a ball-bearing assembly comprising in combination, a housing means for supporting said bearing assembly comprising a spindle which is adapted to mate with the inner race member thereof, means for vertically supporting said spindle in said housing, said means including a pair of spaced flexible diaphragms fixedly secured to said housing around the peripheral edges thereof and arranged to permit substantially only axial displacement of the said spindle, means for axially loading said bearing assembly comprising a rotor drum which is adapted to mate with the outer race member thereof, means for rotating said rotor drum comprising a plurality of spaced jets which are adapted to be energized by compressed gas, an electro-mechanical transducer associated with said spindle for producing an output signal voltage which is proportional in amplitude to the velocity of axial vibrations produced thereon, said transducer including a low mass pickup-coil mounted on said spindle with means mounted on said housing for producing a fixed magnetic field surrounding said coil, and indicator means for measuring said signal voltage.

4. Apparatus for testing a ball-bearing assembly comprising in combination, a housing, means for supporting said bearing assembly comprising a spindle which is adapted to mate with the inner race member thereof, means for vertically supporting said spindle in said housing, said means including a pair of flexible diaphragms, means for axially loading said bearing assembly comprising a rotor drum which is adapted to mate with the outer race member thereof, means for rotating said rotor drum comprising a plurality of spaced jets which are adapted to be energized by compressed gas, electrically operable valve means for controlling the supply of compressed gas to said jets, tachometer means for measuring the rotational velocity of said rotor drum, an electrical time-interval clock for measuring the spin-down time of said bearing, first switch means operatively associated with said tachometer and adapted to be actuated by said tachometer at a selectable maximum rotational speed to simultaneously energize said clock and close said valve, and second switch means operatively associated with said tachometer and adapted to be actuated by said tachometer to stop said clock at a selectable minimum rotational speed.

5. Apparatus for testing a ball-bearing assembly in accordance with claim 4 characterized in that said rotor drum is fabricated from a non-magnetic material and said tachometer comprises in combination a plurality of permanent magnets imbedded at equally spaced distances around the periphery of said drum, means for detecting the rotation of said magnets comprising a pickup-coil which is adapted to produce periodic voltage pulses at a frequency proportional to the rotational velocity of said drum, an electronic counter for developing an output voltage proportional in amplitude to the frequency of said pulses, and indicator means for measuring the output voltage of said counter.

6. Apparatus for testing a ball-bearing assembly comprising in combination, a housing, means for supporting said bearing assembly comprising a spindle which is adapted to mate with the inner race member thereof, means for vertically supporting said spindle in said housing said means including a pair of flexible diaphragms, means for axially loading said bearing assembly comprising a rotor drum which is adapted to mate with the outer race member thereof, means for rotating said rotor drum comprising a plurality of spaced jets which are adapted to be energized by compressed gas, electrically operable valve means for controlling the supply of compressed gas to said jets, tachometer means for measuring the rotational velocity of said rotor drum, an electrical time-interval clock for measuring the spin-down time of said bearing; an electromechanical transducer associated with said spindle for detecting the axial vibrations produced thereon, said transducer being adapted to produce an output signal voltage which is proportional in amplitude to the velocity of the produced vibrations, indicator means for measuring said signal voltage, first switch means operatively associated with said tachometer and adapted to be operated by said tachometer at a selectable maximum rotational speed to energize said clock and to close said valve, and second switch means operatively associated with said tachometer and adapted to be actuated by said tachometer to stop said clock at a selectable minimum rotational speed.

7. Apparatus for testing a ball-bearing assembly comprising in combination, a housing, means for supporting said bearing assembly comprising a spindle which is adapted to mate with the inner race member thereof, means for vertically supporting said spindle in said housing said means including a pair of flexible diaphragms, means for axially loading said bearing assembly comprising a rotor drum which is adapted to mate with the outer race member thereof, means for rotating said rotor drum comprising a plurality of spaced jets which are adapted to be energized by compressed gas, electrically operable valve means for controlling the supply of compressed gas to said jets, tachometer means for measuring the rotational velocity of said rotor drum, an electrical time-interval clock for measuring the spin-down time of said bearing, an electromechanical transducer associated with said spindle for detecting the axial vibrations produced thereon, said transducer being adapted to produce an output signal voltage which is proportional in amplitude to the velocity of the produced vibrations, first indicator means for measuring said signal voltage comprising an oscilloscope, second indicator means for measuring said signal voltage comprising a voltmeter, and third indicator means for measuring said signal voltage comprising a loudspeaker, first switch means operatively associated with said tachometer and adapted to be operated by said tachometer at a selectable maximum rotational speed to energize said clock and to close said valve, and second switch means operatively associated with said tachometer and adapted to be actuated by said tachometer to stop said clock at a selectable minimum rotational speed.

8. Apparatus for testing a ball-bearing assembly comprising in combination, a housing, means for supporting said bearing assembly comprising a spindle which is adapted to mate with the inner race member thereof, means for vertically supporting said spindle in said housing said means including a pair of flexible diaphragms, means for axially loading said bearing assembly comprising a rotor drum which is adapted to mate with the outer race member thereof, means for rotating said rotor drum comprising a plurality of spaced jets which are adapted to be energized by compressed gas, electrically operable valve means for controlling the supply of compressed gas to said jets, tachometer means for measuring the rotational velocity of said rotor drum, an electrical time-interval clock for measuring the spin-down time of said bearing, an electro-mechanical transducer associated with said spindle for detecting the axial vibrations produced thereon, said transducer being adapted to produce an output signal voltage which is proportional in amplitude to the velocity of the produced vibrations, indicator means for measuring said signal voltage, first switch means operatively associated with said tachometer and adapted to be actuated by said tachometer at a selectable maximum rotational speed to simultaneously supply a signal to said indicator, to energize said clock and to close said valve, and second switch means operatively associated with said tachometer and adapted to be actuated by said tachometer to stop said clock at a selectable minimum rotational speed.

References Cited in the file of this patent

UNITED STATES PATENTS

| | | |
|---|---|---|
| 2,468,648 | Abbott et al. | Apr. 26, 1949 |
| 2,787,905 | Prestipino et al. | Apr. 9, 1957 |
| 2,793,525 | Mims | May 28, 1957 |
| 2,937,518 | Bjong et al. | May 24, 1960 |

FOREIGN PATENTS

| | | |
|---|---|---|
| 927,176 | Germany | May 2, 1955 |